US009386078B2

(12) United States Patent
Reno et al.

(10) Patent No.: US 9,386,078 B2
(45) Date of Patent: Jul. 5, 2016

(54) CONTROLLING APPLICATION PROGRAMMING INTERFACE TRANSACTIONS BASED ON CONTENT OF EARLIER TRANSACTIONS

(71) Applicant: CA, Inc., Islandia, NY (US)

(72) Inventors: James D. Reno, Scotts Valley, CA (US); Thomas E. Hamilton, III, Sudbury, MA (US); Kenneth William Scott Morrison, New Westminster (CA)

(73) Assignee: CA, Inc., New York, NY (US)

( * ) Notice: Subject to any disclaimer, the term of this patent is extended or adjusted under 35 U.S.C. 154(b) by 111 days.

(21) Appl. No.: 14/291,598

(22) Filed: May 30, 2014

(65) Prior Publication Data
US 2015/0350174 A1    Dec. 3, 2015

(51) Int. Cl.
*H04L 29/06* (2006.01)
*H04L 29/08* (2006.01)

(52) U.S. Cl.
CPC ............ *H04L 67/10* (2013.01); *H04L 63/1433* (2013.01)

(58) Field of Classification Search
CPC ............ G06Q 20/4016; G06Q 10/0635; H04L 63/08; H04L 45/08; H04L 63/1433; H04L 63/1441; H04L 67/10
USPC ........................................................ 726/3, 25
See application file for complete search history.

(56) References Cited

U.S. PATENT DOCUMENTS

| 2002/0099649 | A1* | 7/2002 | Lee | G06Q 20/04 705/38 |
| 2005/0039036 | A1* | 2/2005 | Eisen | G06Q 40/02 713/193 |
| 2007/0192249 | A1* | 8/2007 | Biffle | G06Q 10/02 705/44 |
| 2010/0114776 | A1* | 5/2010 | Weller | G06F 21/31 705/44 |
| 2014/0207659 | A1* | 7/2014 | Erez | G06Q 30/0633 705/39 |
| 2014/0344155 | A1* | 11/2014 | Liu | G06Q 20/4016 705/44 |

* cited by examiner

*Primary Examiner* — Yogesh Paliwal
(74) *Attorney, Agent, or Firm* — Myers Bigel & Sibley, P.A.

(57) ABSTRACT

Some aspects of the present disclosure operate an application programming interface (API) risk assessment equipment. An API transaction request is received from an application processed by a source node. A risk assessment score is generated based on comparison of content of the API transaction request to content of earlier API transaction requests. The risk assessment score indicates trustworthiness of the API transaction request. Deliverability of the API transaction request to a destination node for processing is controlled based on the risk assessment score.

17 Claims, 9 Drawing Sheets

CONTROLLING APPLICATION PROGRAMMING INTERFACE TRANSACTIONS BASED ON CONTENT OF EARLIER TRANSACTIONS

TECHNICAL FIELD

The present invention relates generally to a networked system of computer nodes and, more particularly, to the management of application interface transactions for applications on computer nodes.

BACKGROUND

Attacks carried out through the Internet against computer applications and equipment are increasing in frequency and sophistication. Tools are presently available to detect and defend against attacks that are carried out through the Internet against HTML interface web applications. However, these tools are strictly targeted at those specific types of attacks. This results in many other types of computer systems, such as computer systems hosting cloud services, remaining vulnerable to attack although they may have a much greater consequential harm if compromised.

SUMMARY

Some embodiments disclosed herein are directed to a method of operating an application programming interface (API) risk assessment equipment. The method includes receiving an API transaction request from an application processed by a source node, and generating a risk assessment score based on comparison of content of the API transaction request to content of earlier API transaction requests. The risk assessment score indicates trustworthiness of the API transaction request. Deliverability of the API transaction request to a destination node for processing is controlled based on the risk assessment score.

In some further embodiments, the risk assessment score is generated based on identifying a cluster of the earlier API transaction requests having content that satisfies a rule for similarity to content of the API transaction request. The cluster may be based on identifying earlier API transaction requests that were received from the source node and/or identifying earlier API transaction requests that were received from applications processed by other source nodes having a defined application characteristic that is common to the application processed by the source node. The risk assessment score may be generated based on how many different source nodes are indicated by content of the earlier API transaction requests in the cluster to be generating the earlier API transaction requests in the cluster, based on comparison of a network address, a geographic location, an API transaction protocol, and/or other information indicated by content of the API transaction request to the same or similar indicated by content of the earlier API transaction requests in the cluster.

Some other embodiments are directed to corresponding API risk assessment equipment.

It is noted that aspects described with respect to one embodiment may be incorporated in different embodiments although not specifically described relative thereto. That is, all embodiments and/or features of any embodiments can be combined in any way and/or combination. Moreover, systems, methods, and/or computer program products according to embodiments will be or become apparent to one with skill in the art upon review of the following drawings and detailed description. It is intended that all such additional systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Some embodiments are directed to reducing security risks associated with the processing of application programming interface (API) transaction requests that are received through APIs of applications on computer equipment, such as applications providing application-to-application Web services or other API application endpoints. Some embodiments disclosed herein provide API risk assessment equipment that can detect explicit threats on a transaction-by-transaction basis by scanning content of API transactions for known attack signatures. Moreover, the equipment may detect more sophisticated attacks by analyzing API transaction requests spanning some or all source nodes (e.g., client computers) being monitored and/or spanning all or part of a sequence of API transaction requests from an application on a source node.

As used herein, an "API transaction" can be any interaction occurring between two or more software applications that may be performed using a defined operational routine, data structure, object classes, and/or variable. For example, SOAP and REST service transactions can be performed using a defined API library of remote calls.

Figure 1:
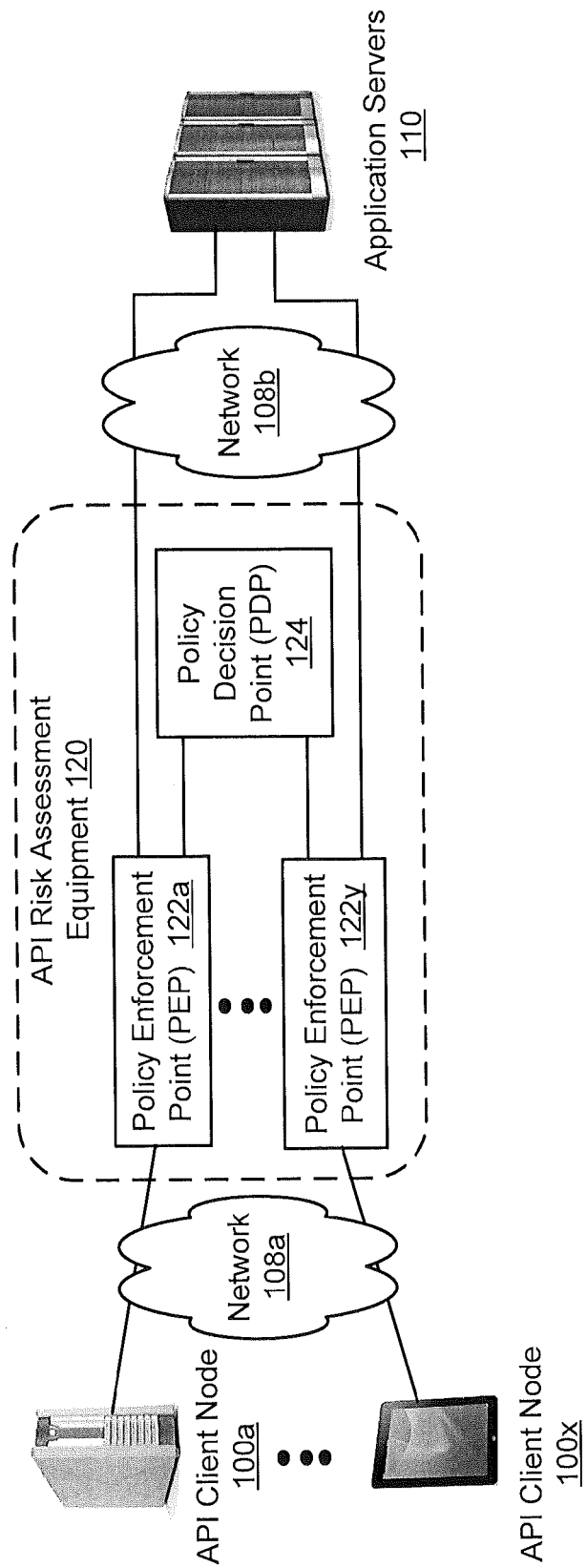
FIG. 1 is a block diagram of a computer system that includes API risk assessment equipment that intercepts and controls deliverability of API transaction requests from API client nodes to application servers, in accordance with some embodiments.

FIG. 1 is a block diagram of an embodiment of a computer system that includes API risk assessment equipment 120 that intercepts and controls deliverability of API transaction requests from API client nodes 100a-100x to application servers 110 for processing.

Referring to FIG. 1, The API risk assessment equipment 120 receives API transaction requests (e.g., Web service API calls, RESTful API transactions, etc.) through one or more data networks 108a from applications processed by one or more API client nodes 100a-100x. The API risk assessment equipment 120 can operate on each of the API transaction requests to generate a risk assessment score based on comparison of content of the API transaction request to content of earlier API transaction requests which have been received from the same source one of the API client nodes 100a-100x and/or from some or all of the API client nodes 100a-100x. The risk assessment score indicates a level of trustworthiness of the API transaction request for processing by an application on the application servers 110. The API risk assessment equipment 120 can control deliverability of the API transaction request through one or more data networks 108b to the application servers 110 for processing based on the risk assessment score.

Because the risk assessment is performed by the API risk assessment equipment 120 and, may be performed before the API transaction request reaches the destination node 110 for processing by an application on the application severs 110, the application can be protected from potential damage and the amount of checking can be reduced that is needed by the application or another component of the application servers 110 to obtain a desired level of security.

As will be explained in further detail below, the risk assessment score can be generated based on comparison of content of the API transaction request to content of earlier API transaction requests. In one example embodiment, a risk assessment score of zero indicates a lowest potential risk of the API transaction causing undesired operation when processed by the application servers 110, while in contrast a risk assessment score of 100 indicates a highest potential risk of the API transaction causing such undesired operation. Various types of undesirable operations that an API transaction may be assessed for as possibly causing risks can include, but are not limited to, attempting to obtain information from application servers 110 for delivery to a falsely identified API client application, attempting to obtain information from the application servers 110 that is not authorized by access privileges of an API client application, attempting to improperly modify operation of one or more applications on the application servers 110, and/or attempting to improperly utilize resources of the application servers 110 (e.g., access resources that are not authorized for use by the API client application).

The source nodes (e.g., API client nodes 100a-100x) can be any type of computer equipment that processes applications to generate API transactions requests, such as Web service API calls, RESTful API transactions, etc., and may include, but are not limited to desktop computers, laptop computers, tablet computers, smart phones, application servers, and mainframe computers. The destination nodes may correspondingly be any type of computer equipment having applications that expose services through APIs and process API transaction requests received through APIs, such as Web service API calls, RESTful API transactions, etc., and may include, but are not limited to mainframe computers, application servers, desktop computers, laptop computers, tablet computers, and smart phones.

As illustrated in FIG. 1, operations of the API risk assessment equipment 120 may reside in a plurality of policy enforcement points (PEPs) 122a-122y and a policy decision point (PDP) 124. One or more of the PEP's 122a-122y may be processed by a same computer host as the PDP 124, or may be processed on physically separate computer hosts that have different network addresses and communicate between them through one or more data networks 108a, 108b, etc. Accordingly, the PDP 124 may operate as a centralized policy decision point for the plurality of geographically dispersed and communicatively connected PEP's 122a-122y that control deliverability of API transaction request from any number of resource nodes (e.g. API clients 100) to any number of destination nodes (e.g. application servers 110). Although a single PDP 124 and two PEPs 122a-y are shown in FIG. 1, it is to be understand that any number of PDP 124 and PEP 122 may be used with various embodiments disclosed herein. Moreover, one or more of these embodiments may be implemented in any type of computer equipment and are not limited to use in a PDP and/or PEP.

The PEP(s) 122 can be responsible for generalized message processing of Web service and other API transaction requests. These requests can include SOAP messages using a variety of transport bindings including, but not limited to, HTTP(s), Message-Oriented Middleware (MOM) such as ActiveMQ, email, TCP sockets, (s)FTP(s), etc). API transaction requests following the RESTful architectural pattern can include HTTP(s) transport and message content types that include, but are not limited to, simple text, binary attachments, XML documents, JSON structures, etc. The PEP(s) 122 can also be responsible for application of rules (policy) to Web services or other API transaction requests. The rules can define an algorithm applied to an API transaction request in flight that has not yet been delivered to the destination node. The algorithm can control one or more of: authentication of credentials associated with the API transaction request; validation of content of the API transaction request; modification of content of the API transaction request; and routing of the API transaction request content to the destination node 110, and/or another node of the system and/or another system. Evaluation of these steps may occur locally for performance reasons; however, some steps may leverage additional external infrastructure elements such as directories, databases, or various PDPs such as described herein.

The PDP can be a rules engine that is optimized for risk evaluation. The rules can include rule sets that are compared (e.g., evaluated to determine if one or more is satisfied) to content of an API transaction request to generate a risk assessment score. Rule sets that detect typical fraud patterns can be defined or developed by learning-based processes over time. In addition, rule sets can be customizable to detect emerging threats or to accommodate local needs.

Various potential advantages that may be obtained by separating operations of the PEP from operations of the PDP may include, but are not limited to: 1) enabling administrative separation of concerns between the administration of PDP risk-associated policy and rule sets and the administration of PEP message-in-flight handling policy (including remediation action(s) based on risk score); and/or 2) allowing a single PDP to serve many PEP instances which can provide favorable reuse efficiencies for enterprise systems having many API clients and/or many application servers.

Figure 2:
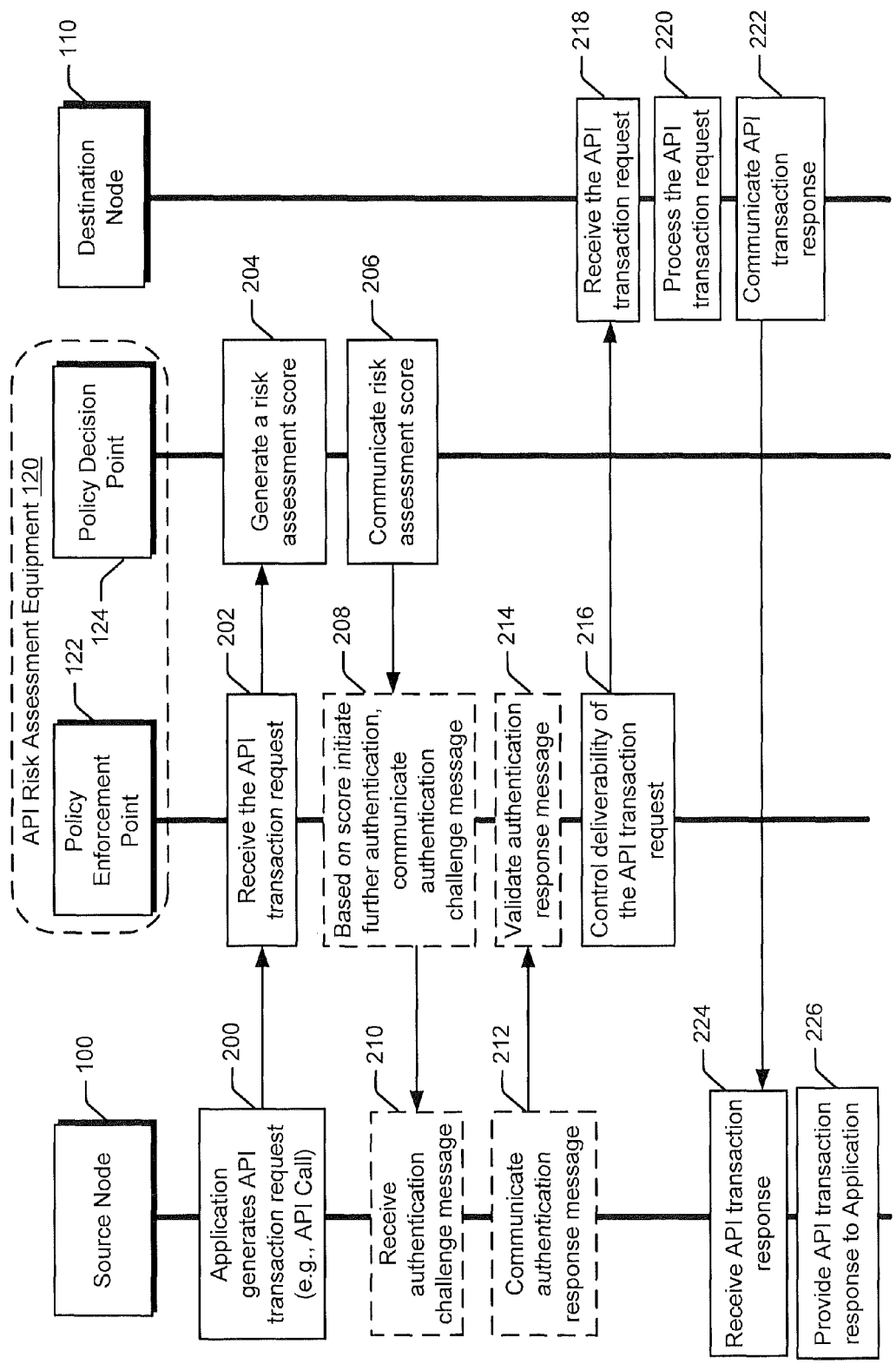
FIG. 2 is a flowchart of operations and information flows that may be performed by the system components of FIG. 1, in accordance with some embodiments.

FIG. 2 is a flowchart of operations and information flows that may occur between the system components of FIG. 1, in accordance with some embodiments. Referring to FIG. 2, an application processed by the source node 100 (e.g., API client) generates (block 200) an API transaction request that is communicated through a data network for processing by one or more applications on a destination node 110 (e.g., application servers). The PEP 122 receives (block 202) the API transaction request, and may be configured to intercept the API transaction request to prevent it from reaching the destination node 110 without the PEP 122 first authorizing its delivery to the destination node 110. The PEP 122 communicates the API transaction request (e.g., the entire API transaction request or information characterizing the API transaction) to the PDP 124.

The PDP 124 generates (block 204) a risk assessment score based on comparison of content of the API transaction request to content of earlier API transaction requests. The risk assessment score indicates a level of trustworthiness of the API transaction request for processing by an application on the destination node 110. The PDP 124 communicates (block 206) the risk assessment score to the PEP 122. The PEP 122 controls (block 216) deliverability of the API transaction request to the destination node 110 for processing based on the risk assessment score. API transaction requests that are deemed to have insufficient trustworthiness, based on the risk assessment score and a defined risk assessment rule, may not be delivered to the destination node 110 or may be modified before delivery in order to shield the destination node 110 from possible API based intrusion attacks and other malicious or undesirable operations that may occur if the API transaction requests were allowed to be processed by the destination node 110.

The PDP 124 may generate the risk assessment score based on a collection of context information that characterizes API transaction requests received by a plurality of the PEPs 122. The PDP 124 may generate the risk assessment score based on a pattern over time determined from content of API transaction requests received by a plurality of the policy enforcement points from the same source node and/or from a plurality of source nodes.

The PEP 122 controls (block 216) deliverability of the API transaction request to the destination node 110 for processing based on the risk assessment score. Depending upon the risk assessment score, the PEP 122 can deliver the API transaction request to the destination node 110 for receipt (block 218). The destination node 110 processes (block 220) the API transaction request to generate an API transaction response (e.g., by retrieving or generating information requested by the API transaction request), and communicates (block 222) the API transaction response to the source node 100. The source node 100 receives (block 224) the API transaction response, and provides (block 226) the API transaction response to the application on the source node 104 for processing.

The PEP 122 may, based on the risk assessment score (e.g. risk assessment score not satisfying a defined threshold value or other risk assessment rule), initiate further authentication through an authentication challenge process that attempts to authenticate the source node 100, the application that generated (block 200) the API transaction request, a person operating the source node 100, etc. The authentication challenge process includes communicating (block 208) an authentication challenge message to the source node 100. The source node 100, or application process thereon, receives (block 210) the authentication challenge message 210 and communicates (block 212) an authentication response message 212, which may contain identification information for the application that generated API transaction request and/or for the source node 100, and/or which may contain an authentication key or other authentication information (which may be based on one or more authentication processes and technologies known in the art). The PEP 122 validates (block 214) content of the authentication response message and can control (block 216) deliverability of API transaction request based on whether or not the authentication response message was properly validated. For example, when the PEP 122 determines that credentials received in the API transaction request are invalid or otherwise suspicious (e.g., based on a defined validation rule or other risk assessment rule), the PEP 122 may discard the API transaction request without delivering it to the destination node 110.

The PEP 122 may apply API transaction request handling policies for access control that control whether or not the API transaction request is delivered to the destination node 110, and may also include per-message threat detection, message content transformation, rate limiting, and/or routing to one or more defined other nodes of the system for further analysis and/or deliverability decision-making. The policies can include performing call-outs to provide context information for one or more API transaction request to one or more PDPs 124 for generation of risk assessment score(s) used to control deliverability of API transaction request(s).

In another embodiment, instead of the PEP 122 controlling deliverability of the API request to the destination node 110 for processing based on the risk assessment score, the PEP 122 may instead forward the API request with the risk assessment score to the destination node 110. The destination node 110 can then perform policy decision making based on the risk assessment score to determine whether and/or how it will handle processing of the API request. If the risk assessment score does not satisfy a defined policy, the destination node 110 may, for example, reject the API request, initiate further authentication through an authentication challenge process that attempts to authenticate the source node 100, the application that generated (block 200) the API transaction request, a person operating the source node 100, etc.

The communication interface between the PEP 122 and the PDP 124 may be based on a request and response API. The PEP 122 may communicate (block 202) to the PDP 124 information that characterizes the originating network address (e.g., IP address) of the source node 100, an authenticated identifier of the application which generated the API transaction request or an unauthenticated identifier of an electronic device executing the application, a unique device identifier for the source node 100 or an electronic device associated therewith, and/or one or more custom elements associated with the API transaction request, which may include transport meta data (e.g., query or post parameters, URL, HTTP headers, MOM-headers, etc), API transaction request content (e.g., a credit card number), and/or or operational state variables of the PEP 122. The operational state variables of the PEP 122 may include, for example, a current rate at which API transaction requests are being received for a particular API of the application of the destination node 110 and/or for other applications of the destination node 110; and/or a current rate at which API transaction requests are being received from a particular application of the source node 100 and/or from other applications of the source node 100 or other source nodes, etc.

Operations that the PEP 122 can perform to control deliverability of the API transaction request based on the risk assessment score can include any one or more of: 1) allowing the API transaction request by forwarding it to the destination node 110; 2) denying the API transaction request by discarding it to prevent its processing by an application of the destination node 110; 3) delaying delivery of the API transaction request; 4) controlling rate of a sequence of API transaction requests; 5) modifying content of the API transaction request; 6) perform a first/further authentication process; and 7) other operations described below. The PEP 122 may map different ranges of risk assessment scores to different operations that the PEP 122 can perform to control deliverability of the API transaction request, and can thereby use a risk assessment score received from the PDP 124 to select among the available operations to control deliverability of the associated API transaction request.

The mapping of different ranges of risk assessment scores to different available operations to control deliverability of the associated API transaction requests may be configured by an administrator based on the extent of undesirable consequences that can arise from processing of API transmission requests by the destination node 110. In one embodiment, an administrator can define policies that cause API transaction requests having a score greater than the first defined threshold (e.g., 50) to be discarded (e.g. blocked), cause API transaction requests having a score less than a second defined threshold (e.g., 20) to be allowed to pass through to the destination node 110 for processing, and cause API transaction requests having a score between the first and second defined thresholds to properly complete further authentication before being allowed to pass through to the destination node 110 for processing.

FIGS. 3-7 are flowcharts that illustrate operations that may be performed by one or more components of the API risk assessment equipment 120 of FIGS. 1-2 to control (block 216 of FIG. 2) deliverability of the API transaction request through a data network to the destination node 110 for processing, in accordance with some embodiments.

The PDP 124 may generate a risk assessment score based on information regarding API transaction requests that are characterized or assessed by other PEPs or by other systems. The PDP 124 may make calls out to other databases to evaluate the API transaction requests. The PDP 124 therefore can be open-ended to include external sources of information as bases for generation of a risk assessment score. The PDP 124 may use information received from a plurality of PEPs when generating a risk assessment score, which may allow the PDP 124 to look for API transaction request patterns across the system for indications of fraudulent or other undesirable activity which in context should affect a risk assessment score for a API transaction request.

Figure 3:
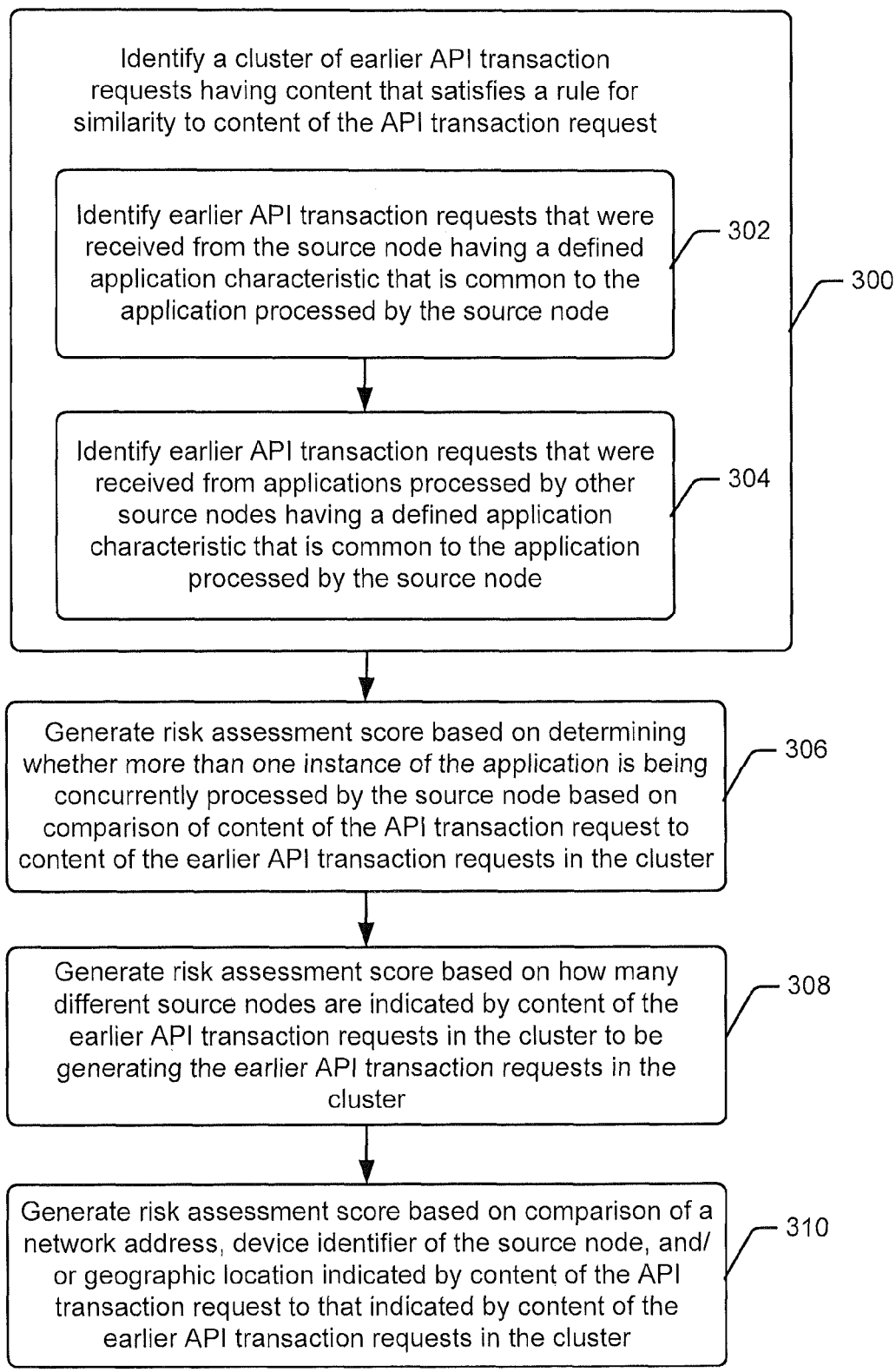
FIGS. 3-7 are flowcharts that illustrate operations that may be performed by one or more components of the API risk assessment equipment of FIGS. 1-2, in accordance with some embodiments.
Figure 4:
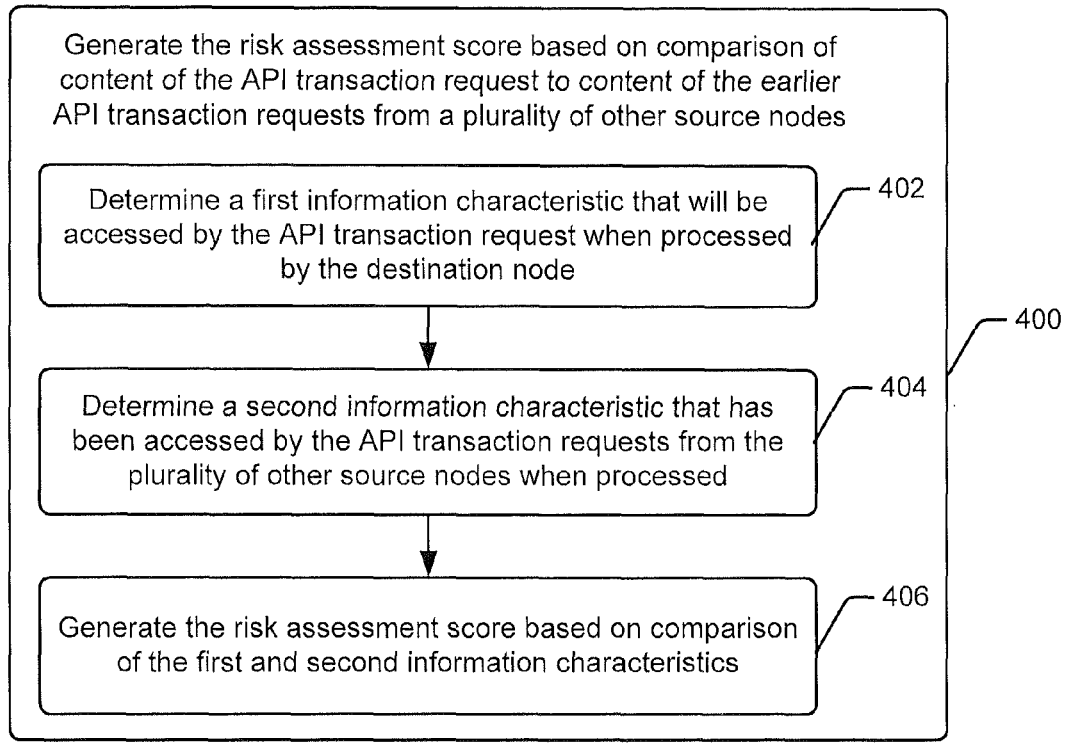
Figure 5:
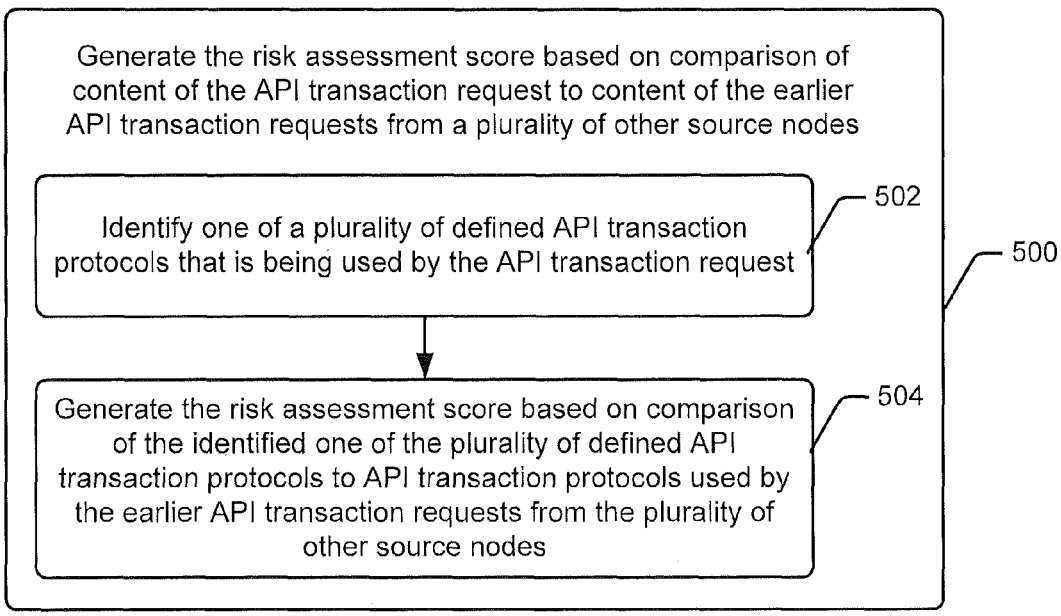

FIG. 3 illustrates operations that may be performed by the PDP 124 of the API risk assessment equipment to generate (e.g., block 204 of FIG. 2) the risk assessment score according to some embodiments. Referring to FIG. 3, the PDP 124 identifies (block 300) a cluster of the earlier API transaction requests having content that satisfies a rule for similarity to content of the API transaction request that has been received from an application on the source node 100.

Identification of the cluster of the earlier API transaction requests may include identifying (block 302) earlier API transaction requests that were received from the source node and/or identifying (block 304) earlier API transaction requests that were received from applications processed by other source nodes having a defined application characteristic that is common to the application processed by the source node.

Some non-limiting examples of comparisons that may be performed by the PDP 124 to generate (block 204) a risk assessment score can include any one or more of the further operations shown in FIG. 3.

In one embodiment, the risk assessment score is generated (block 306) based on determining whether more than one instance of the application is being concurrently processed by the source node based on comparison of content of the API transaction request to content of the earlier API transaction requests in the cluster.

In another embodiment, the risk assessment score is generated (block 308) based on how many different source nodes are indicated by content of the earlier API transaction requests in the cluster to be generating the earlier API transaction requests in the cluster.

In another embodiment, the risk assessment score may be generated (block 310) based on comparison of a network address indicated by content of the API transaction request to network addresses indicated by content of the earlier API transaction requests in the cluster. The risk assessment score may be generated (block 310) based on comparison of a device identifier indicated by content of the API transaction request to device identifiers indicated by content of the earlier API transaction requests in the cluster.

The risk assessment score may be generated based on a type of source node (e.g., mobile phone) that generated the API transaction request, a particular type of application (e.g., an application on an iPhone versus an android phone) that generated the API transaction request, a type of operating system, a type of network through which an API transaction request is communicated, a particular device ID of the source node 100, or any other characteristic of the source node 100 or intervening system components. The PEP 122 and/or the PDP 124 may perform a deep inspection of content of an API transaction request, and compare the content to expected types of variable/field values and ranges of variable/field values, and/or comparison between values of content variables/fields, and generate the risk assessment score based thereon. The PEP 122 and/or the PDP 124 may determine the type of application and/or device of the source node 100 (e.g., Apple IOS device, Android OS device, Windows OS device, Unix OS device, etc.), and may restrict deliverability and/or privileges of the API transaction request based thereon. For example, the PDP 124 may vary the risk assessment score to cause discarding of the API transaction request based on the API transaction request being received from an iPad device and/or based on a value of the request being outside an expected range.

The risk assessment score may be generated based on the geographic location of a source node 100, such as based on comparison of the geographic location to one or more defined geographic fence regions (e.g., countries banned under governmental law from business). The PDP 124 can also use external services to acquire deeper information about the API transaction requests. Services such as Neustar (formerly Quova) can provide authoritative geographic coordinates of an IP address (both fixed line and wireless using telco APIs). These can also supply centrally coordinated information about potentially threatening IP addresses based on prior attacks, as well as known proxy services that could be masking a true upstream IP.

The risk assessment score may be generated (block 310) based on comparison of a geographic location indicated by content of the API transaction request to geographic locations indicated by content of the earlier API transaction requests in the cluster. The PDP 124 may determine geographic locations associated with network addresses of the source node contained in a sequence of API transaction requests from the application processed by the source node 100. The risk assessment score can be generated based on whether the geographic locations change more than a threshold distance within a threshold time. For example, if the source node 100 is expected to be stationary or not have more than a threshold velocity, observing more than a threshold velocity can indicate a untrustworthiness of API transaction requests therefrom. Thus, receiving one request from a source node 100 located in a city in California followed by another request within a threshold elapsed time but appearing to be from the same source node 100 but now located in a city in Europe, may be an indication that the request is fraudulent and should be discarded or restricted (e.g., modified) according to one or more embodiments herein. A factor that may be considered when generating the risk assessment score is whether more than one application is associated with a shared account on the destination node 110.

The PDP 124 may generate the risk assessment score to indicate untrustworthiness of the API transaction request when a rate at which API transaction requests were received from the source node does not satisfy a threshold rate defined based on another rate at which at least some of the earlier API transaction requests in the cluster were received from a plurality of other source nodes.

The PDP 124 may assess each API transaction request separately (e.g., transaction-by-transaction) or may apply risk assessment rules to assess a sequence of transactions to identify trends or patterns that are indicative or trustworthiness. The PDP 124 can generate the risk assessment score based on a collection of information that characterizes API transaction requests received by a plurality of the policy enforcement points. The PDP 124 can compare transactions, sequences, and/or trends from information across API transaction requests received from a plurality of source nodes 100 and/or which is provided by a plurality of different PEPs 122. The PDP 124 can monitor and identify usage patterns for API transaction requests generated by, for example, a particular application on one of the API clients 100a-100x, a particular type of application on any of the API clients 100a-100x, the content or metadata of the API transaction requests for evaluation in risk analysis.

As explained above, the PDP 124 may generate the risk assessment score based on comparison of content of the API transaction request to content of the earlier API transaction requests from a plurality of other source nodes. Assessing risk based on comparison to earlier API transaction requests can be useful to detect when applications try to hack systems by relying upon the fact that the web is not statefull (e.g., each API transaction request contains all information needed to process that request without expecting the destination node 110 to have retained state information from one or more related earlier API transaction requests). Such hackers can attempt to then deviate from a logical or expected sequence to, for example, obtain access to system resources and/or application information for which they are not authorized to access. The PDP 124 can thereby observe sequences of content items of API transaction requests and/or timing of API transaction requests and compare such observations to an expected sequence and/or timing of API transaction requests to determine whether it is a trustworthy (e.g., valid) sequence.

In one embodiment, a first information characteristic that will be accessed by the API transaction request when processed by the destination node is determined, and a second information characteristic that has been accessed by the API transaction requests from the plurality of other source nodes when processed is determined. The PDP 124 then generates the risk assessment score based on comparison of the first and second information characteristics.

In another embodiment, the PDP 124 identifies one of a plurality of defined API transaction protocols that is being used by the API transaction request, and generates the risk assessment score based on comparison of the identified one of the plurality of defined API transaction protocols to API transaction protocols used by the earlier API transaction requests from the plurality of other source nodes. For example, when an API transaction from a particular source node application is provided by a REST API instead of a Web services API or another transaction protocol that is expected to be received, the PDP 124 indicate a higher assessed risk by the generated risk assessment score.

In another embodiment, the PDP 124 generates the risk assessment score based on whether the source node has a network address that is within a list of defined network addresses of source nodes that are sources of untrustworthy API transaction requests and/or based on whether the source node has a network address that is within a list of defined network addresses of source nodes that are sources of trustworthy API transaction requests. In this manner, particular source nodes and/or applications located in some defined geographic regions or having defined identifiers can be blacklisted. A list of source addresses that are known to be compromised, known originator of intrusion or other attacks, and/or associated with fraudulent requests can be developed over time or received from an administrator or system component. Conversely, a list of source addresses (e.g., IP addresses known to be associated with Amazon Web Services, etc.) that are known to be sources of trustworthy API transactions requests can be developed over time or received from an administrator or system component.

In another embodiment, the PDP 124 determines from content of the API transaction request a routing address pathway through a data network from the source node to the API transaction decision equipment. The PDP 124 then generates the risk assessment score based on whether the routing address pathway includes a network address that is within a list of defined network addresses of anonymizing servers, such as virtual private network (VPN) proxy servers or aggregator nodes.

As explained above, the PDP 124 can communicate (block 206 of FIG. 2) the risk assessment score to the PDP 122 which operates to control (block 216) deliverability of an API transaction request to the destination node 110.

Figure 6:
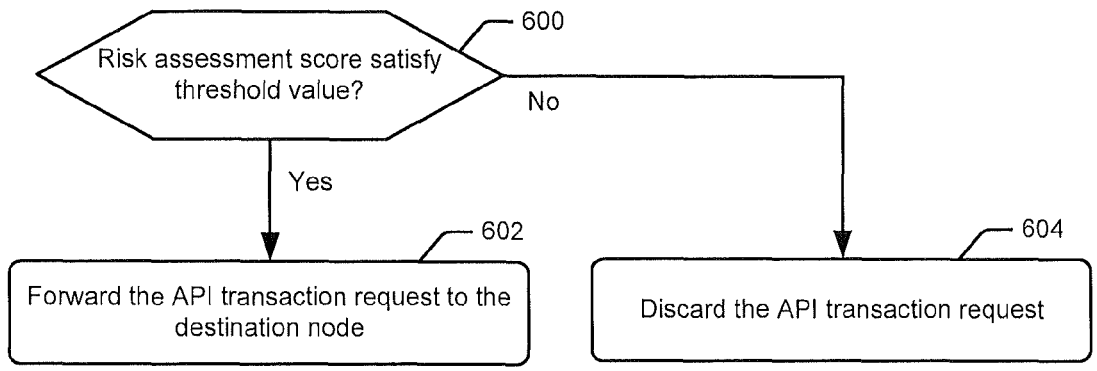

Referring to the embodiment of FIG. 6, the PEP 122 determines (block 600) whether the risk assessment score satisfies a threshold value, and forwards (block 602) the API transaction request to the destination node 110 based on the risk assessment score satisfying a threshold value. In contrast, the PEP 122 discards (block 604) the API transaction request to prevent its processing by the application of the destination node 110 based on the risk assessment score not satisfying the threshold value. A denial of service message may be communicated back to the source node 100 when an API transaction request is discarded, if the source node 100 supports such protocol flow control.

Figure 7:
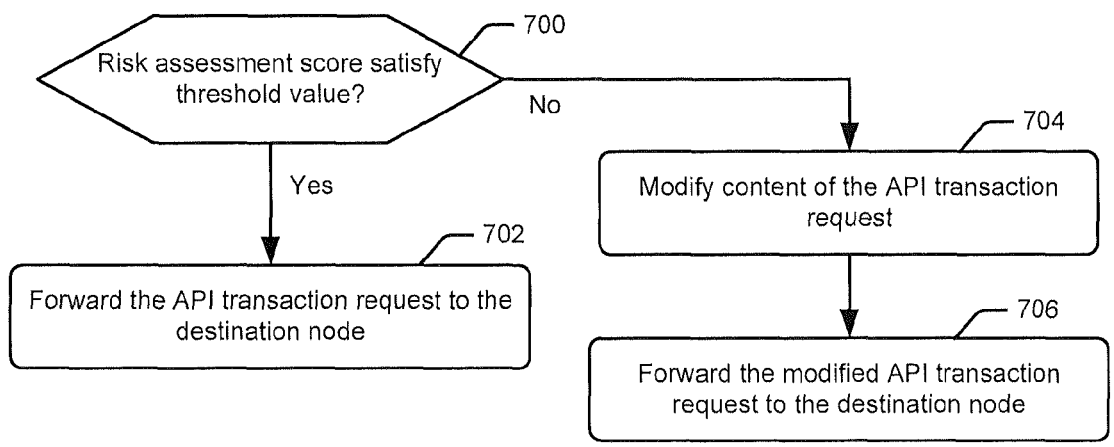

Referring to FIG. 7, the PEP 122 determines (block 700) whether the risk assessment score satisfies a threshold value, and forwards (block 702) the API transaction request to the destination node 110 based on the risk assessment score satisfying a threshold value or other defined risk assessment rule. In contrast, the PEP 122 modifies (block 704) content of the API transaction request to generate a modified API transaction request based on the risk assessment score not satisfying the threshold value, and forwards (block 706) the modified API transaction request to the destination node 110. The PEP 122 may modify (block 704) content by modifying a variable contained in the modified API transaction request that constrains what type of information will be accessed by the modified API transaction request when processed by the application on the destination node 110.

An example would be if an API transaction request is querying a sensitive database. While some information may be provided at a normal rate, other information may be provided at a slower controlled rate to allow continued inspection of the risk of processing the API transaction request. If the continued inspection of the risk of processing the API transaction request results in a sufficiently untrustworthy risk assessment score, the PEP 122 can terminate any further providing of information from the destination node 110 to the source node 100. The PEP 122 may modify an API request that is seeking 100 rows of information to instead provide access to only 20 rows of information if the API transaction request has a sufficiently untrustworthy risk assessment score.

The PDP 124 may operate with the PEP 122 to stop an API transaction request in-flight by having the PEP 122 intercept and hold an API transaction request until it receives the risk assessment score from the PDP 122 and determines therefrom how to control deliverability of the API transaction request to the destination node 110 for processing.

Alternatively, the PDP 124 may monitor API transaction requests without introducing delay (or substantial delay) as they are communicated through one or more networks for receipt by the destination node 110. The PDP 124 may analyze the API transaction requests to identify their untrustworthy characteristics (e.g., identify one or more trustworthiness rules that are satisfied or not satisfied by one or more API transaction requests) potentially after completion of their processing by the destination node 110, and may cause defined remedial actions to be performed to undo the result of an earlier processed API transaction request that has now been deemed sufficiently untrustworthy. The PDP 124 may alternatively or additionally notify the destination node 110 and/or another network node when an API transaction request is not to be trusted, which may cause the destination node 110 and/or the network node to take a present action with respect to the API transaction request and/or to take a future action with respect to subsequent API transaction requests from the source node 100. Some operations of the PDP 124 may developed based on a web access software architecture provided by the RiskMinder™ product by CA Technologies, Inc.

The PEP 122 can select and apply remediation actions to control deliverability of a presently received API transaction request and/or future received API transaction requests, and/or to remedy actions caused by processing performed by the destination node 110 and/or by the source node 100. The remediation actions may then be applied to change mapping between ranges of risk assessment scores and corresponding actions performed by the PEP 122 to control deliverability of API transaction requests. Such operations may help to reduce the potential of applications becoming compromised by malicious parties attempting to use limitations of application-to-application communication protocols (e.g., state less transaction protocols).

Operations for controlling deliverability of API transaction requests can include user privilege management. An API transaction request can be handled differently based on an authentication level determined for the source node 100 or an application processed by the source node 100 which generated the API transaction request, and/or based on identification of a user of the source node 100. Different source nodes 100 and/or applications can have different authentication levels. When a source node 100 and/or application has properly performed a step up access control process, the source node 100 and/or application can be granted a more trusted authentication level (e.g., a root account), and API transaction requests received from that source node 100 and/or application can be handled using different deliverability control rules and/or different flow control. For example, the PEP 122 may, depending upon the authentication level of the source node 100 and/or application, either intercept and hold API transaction requests before selectively delivering to the destination node 110 or allow uncontrolled delivery to the destination node 110 with continuing assessment of risk associated with the API transaction requests. The authentication level of the source node 100 and/or application may be adjusted over time based on comparison of the API transaction requests to risk assessment rules.

Content of an API transaction request can be modified based on the authentication level of the source node 100 and/or the application which generated the API transaction request. Different data can thereby be provided in an API response from the destination node 110 depending upon the authentication level of the source node 100 and/or the application. When operating at a root level, API transaction requests from the source node 100 and/or application can cause the destination node 110 to provide a greater quantity of information, more sensitive information, etc. in API responses. For example a root level API source node 100 and/or application who is querying user accounts can be provided a larger set of data (full account details) then a non-root level API source node 100 and/or application that may be provided only the account names and associated name of the persons. The amount of information and/or type of information that is returned and an API response to an API transaction request can thereby be dynamically controlled by modification of content of the API transaction request based on the risk assessment score.

The PDP 124 can obtain risk assessment rules from a remote repository(ies) (e.g., a centralized repository used by a plurality of PDPs) and/or an internal repository, and may develop or modify risk assessment rules over time, such as based on feedback received from the PEP 122, the destination node 110 and/or the source node 100/application.

Figure 8:
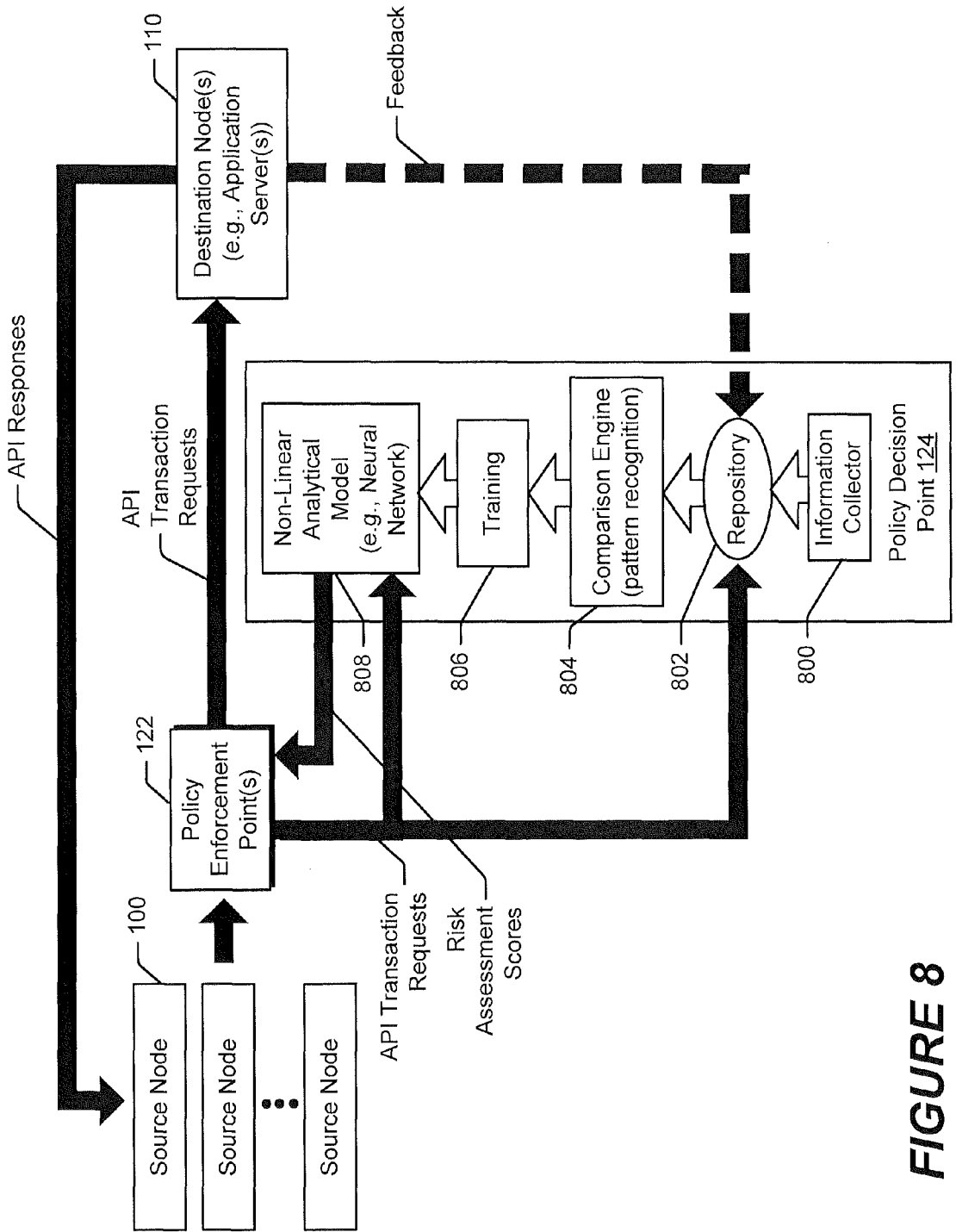
FIG. 8 is another block diagram illustrating use of a non-linear analytical model which is trained based on API transaction requests to generate a risk assessment score in accordance with some embodiments.

FIG. 8 is another block diagram illustrating use of a non-linear analytical model which is trained based on API transaction requests to generate a risk assessment score in accordance with some embodiments. Referring to FIG. 8, one or more PEPs 122 receive API transaction requests from a plurality of source nodes 100 (e.g., API client nodes 100*a*-100*x* of FIG. 1). The one or more PEPs 122 provide the API transaction requests or information derived based thereon to the PEP 124. Accordingly, although various embodiments of a PDP 124 are described in the context of processing API transaction requests, the term API transaction requests can refer to other information that is derived by the PEP(s) 122 based on API transaction requests that are received from the source nodes 100.

The PDP 124 is configured to process the API transaction requests through a non-linear analytical model 808, which can be a neural network, to generate risk assessment scores. The non-linear analytical model 808 has a non-linear relationship that allows different risk assessment scores to be generated from a sequence of cycles of processing the same items of content (content items) of API transaction requests. Thus, repetitively processing the same content items of API transaction requests through the non-linear analytical model 102 can result in output of different corresponding risk assessment scores.

The non-linear analytical model 808 may, for example, receive hundreds or thousands of simultaneously occurring or nearly simultaneously occurring API transaction requests from tens, hundreds, or thousands of different source nodes 100, and generate risk assessment scores that are used to separately control deliverability the API transaction requests to the one or more destination node 110.

The PDP 124 can include an information collector 800 that stores API transaction requests or information derived therefrom in a repository 802. The API transaction requests or information may be stored through a lossy combining process. For example, the content item of an API transaction request may be mathematically combined and/or summarized with another content item of the same or another API transaction request and/or may be mathematically combined and/or summarized with one or more items already stored in the repository 802. The mathematically combining may include counting occurrences, averaging of amounts, etc. Summarization may include statistically representation or other characterization of the content items.

A comparison engine 804 compares content of the API transaction requests based on what is stored in the repository to recognize patterns or other similarities and/or differences that satisfy one or more defined rules. As explained above, the PDP 124 generates a risk assessment score indicating trustworthiness of a API transaction request based on comparison of content of the API transaction request to content of earlier API transaction requests from the same source node or from other source nodes, such as by recognizing patterns among the content items or other similarities and/or differences between the API transaction request and the earlier API transaction requests that satisfy one or more defined rules.

Output of the comparison engine 804 can additionally be used by a training circuit 806 (e.g., computer readable program code executed by a processor) to train the non-linear analytical model 808. The non-linear analytical model 808 may be a neural network model. The training circuitry 806 can train the non-linear analytical model 808 based on comparison (e.g., by the comparison engine 804) of similarities and/or differences (e.g., according to one or more defined rules) between content of the API transaction requests identifiable based on what is stored in the repository. The non-linear analytical model 808 can be trained based on patterns that are recognized by the comparison engine 804 among the content items, such as one or more of the comparisons described above as being performed by the PDP 124 to generate risk assessment scores (e.g., comparison of network addresses, device identifiers, geographic locations, other content items, API protocols, rates at which API transaction requests were received, etc.).

The training circuitry 806 may alternatively or additionally train the non-linear analytical model 808 based on feedback from the destination node(s) 110, which may indicate characteristics of API transaction requests that have exhibited defined levels of risk and/or which have been detected by the destination node(s) 110 as attempting or not attempting various defined types of undesirable operations. The defined types of undesirable operations can include, but are not limited to, attempting to obtain information from destination node(s) 110 for delivery to a falsely identified API client application, attempting to obtain information from the destination node(s) 110 that is not authorized by access privileges of an API client application, attempting to improperly modify operation of one or more applications on the destination node(s) 110, and/or attempting to improperly utilize resources of the destination node(s) 110 (e.g., access resources that are not authorized for use by the API client application).

Accordingly, the non-linear analytical model 808 can learn over time to identify particular content or patterns of content occurring in a sequence of API transaction requests from a same source node 100 and/or occurring across a plurality of API transaction requests from different source nodes 100 within a threshold time (e.g., simultaneously occurring or nearly simultaneously occurring) that are indicative of a greater or lesser risk.

Figure 9:
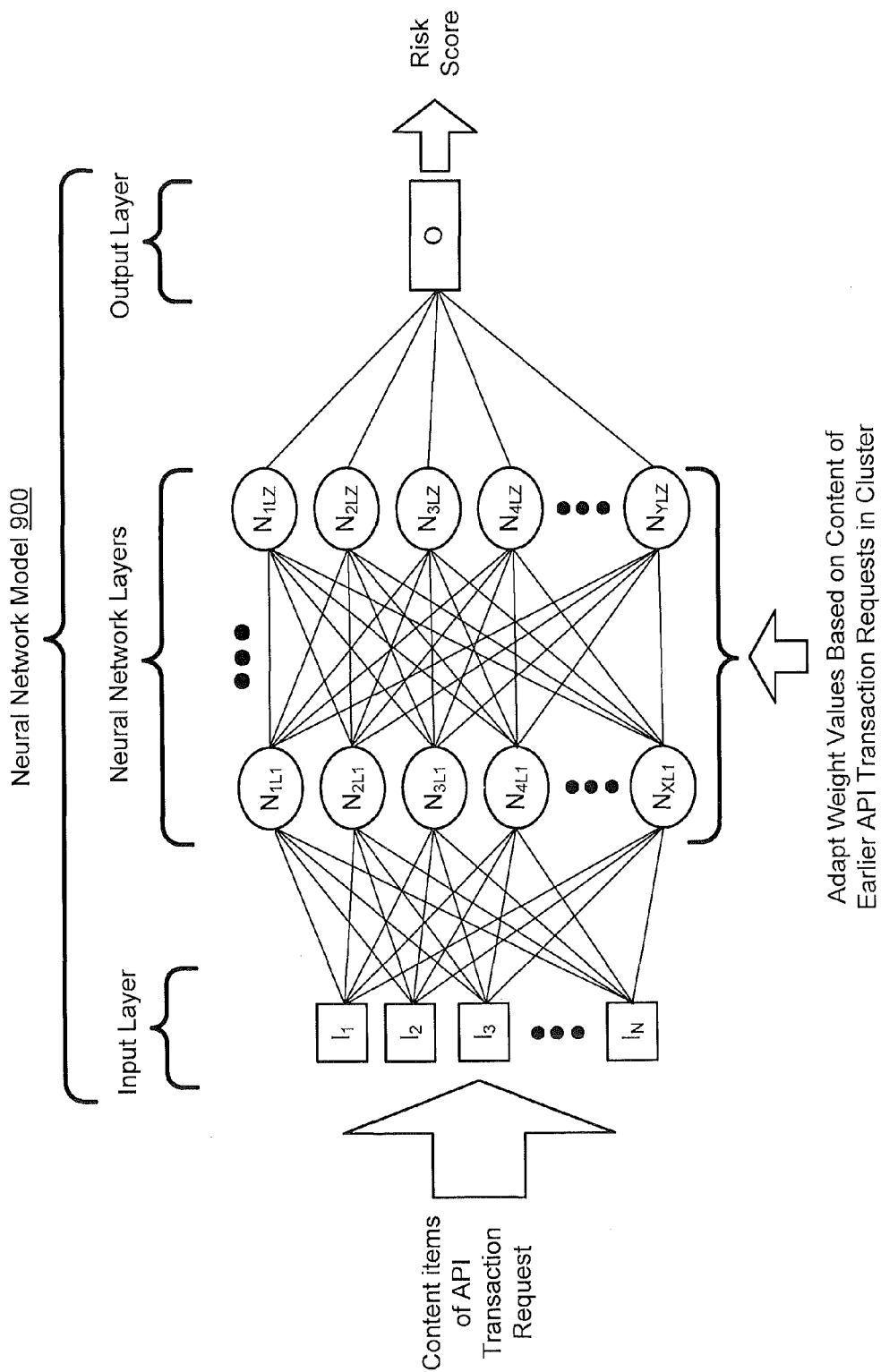
FIG. 9 is a block diagram of a neural network model that can be used in API risk assessment equipment to generate a risk assessment score indicating trustworthiness of an API transaction request, in accordance with some embodiments.

FIG. 9 is a block diagram of a neural network model 900 that may be used in the non-linear analytical model 808 of PDP 124 in FIG. 8 to generate risk assessment scores. Referring to FIG. 8, the neural network model 900 includes an input layer having a plurality of input nodes, a sequence of neural network layers each including a plurality of weight nodes, and an output layer including an output node. In the particular non-limiting example of FIG. 9, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLz}$ (where Y is any plural integer). The output layer includes an output node O.

The neural network model 900 of FIG. 9 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of content items of an API transaction request that are to be simultaneously processed and the number of API transaction requests that are to be simultaneously processed. The number of output nodes can be similarly selected based on the number of risk assessment scores that are to be simultaneously generated therefrom.

The neural network model 900 can be operated to process a plurality of items of content of an API transaction request through different inputs (e.g., input nodes $I_1$ to $I_N$) to generate a risk assessment score. The neural network model 900 can be operated to simultaneously process items of content of a plurality of different API transaction requests from the same or different ones of the source nodes 100 through different inputs nodes to generate a risk assessment score for each of the API transaction requests.

By way of example, an API transaction request can have 13 content items, each of which can be separately provided to a different one of input nodes $I_1, I_2, \ldots I_{13}$. Items of content of other API transaction requests occurring simultaneously or within a threshold time can be similarly provided to further groups of input nodes (e.g., group $I_{14}$-$I_{26}$, group $I_{27}$-$I_{39}$, etc.). In this particular example, the content items associated with 100 different API transaction requests can be simultaneously or nearly simultaneously provided to an array of 1300 input nodes I (e.g., 100 API transaction requests, each having 13 content items). The weight nodes N of a plurality of neural network layers can process values output by the input nodes I to generate combined values that are provided to an array of output nodes O. The number of output nodes may be the same as the number of API transaction requests that are simultaneously processed by the neural network model 900, with each of the output nodes outputting a risk assessment score for a different one of the API transaction requests. Thus, when the neural network model 900 is configured to simultaneously process 100 different API transaction requests, 100 output nodes O can be provided to each output a risk assessment score for a different one of the 100 API transaction requests.

The interconnected structure between the input nodes, the weight nodes of the neural network layers, and the output nodes causes the characteristics of each content item of an API transaction request to influence the risk assessment score is generated for the API transaction request. Moreover, when a plurality of API transaction requests are simultaneously processed, the content items of each API transaction request influences the risk assessment score generated for some or all of the other API transaction requests that are concurrently processed. The risk assessment scores generated by the neural network model 900 may thereby generate a comparative assessment of risk associated with the simultaneously processed API transaction requests. The risk assessment score is generated for an API transaction request can therefore be dependent upon characteristics of other API transaction requests that are being simultaneously processed. The PDP 124 may thereby effectively evaluate relative risks between API transaction requests that have been previously processed from the same source node and/or other source nodes and/or which are presently being processed from the same source node and/or other source nodes.

As explained above, the PDP 124 can identify a cluster of the earlier API transaction requests having content that satisfies a rule for similarity to content of the API transaction request. Further example operations are illustrated in the flowchart of FIG. 10 to train (block 1000) a non-linear analytical model based on content of earlier API transaction requests in a cluster, and to process (block 1010) content of a received API transaction request through the non-linear analytical model to generate the risk assessment score.

Figure 10:
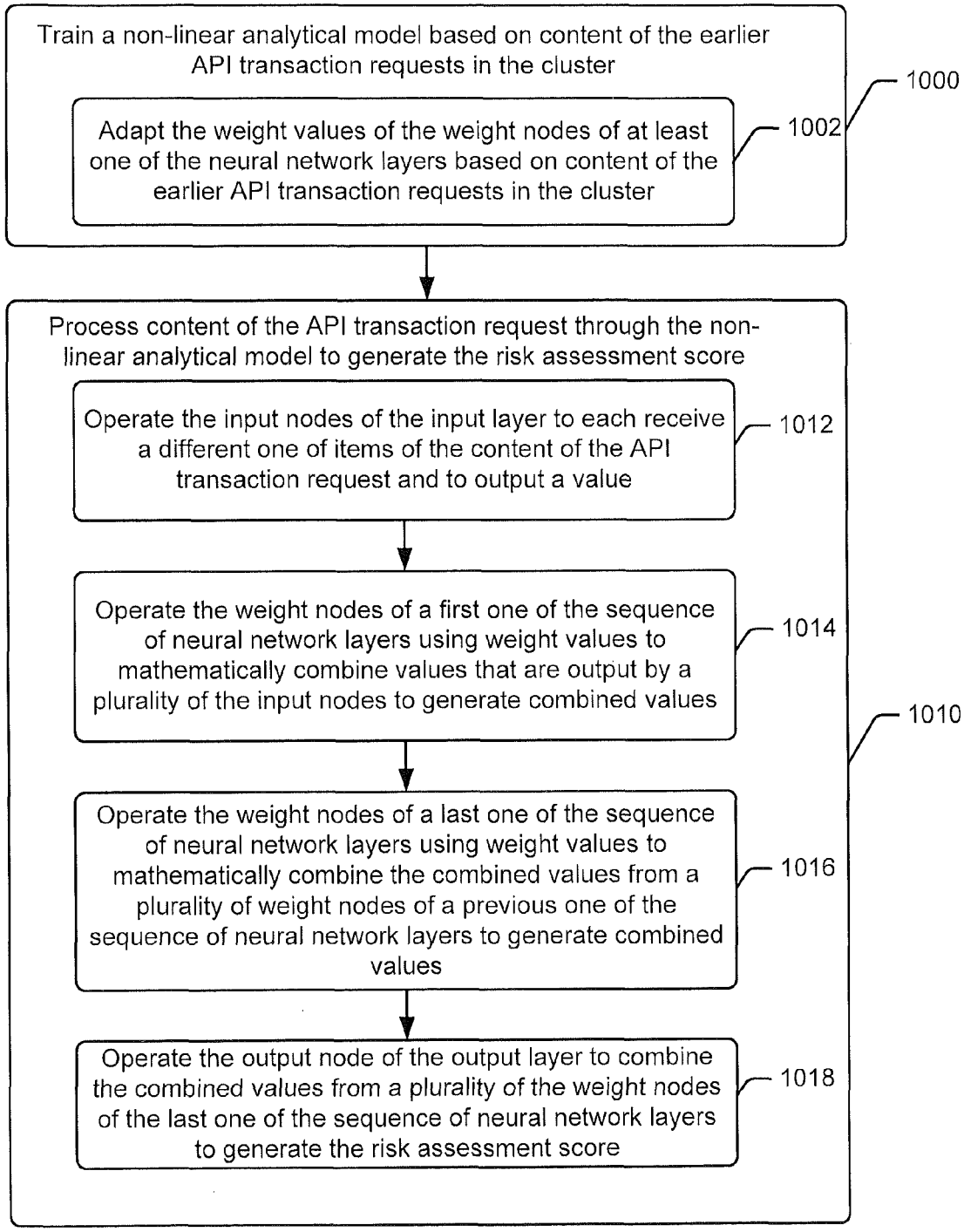
FIG. 10 is a flowchart that illustrate operations that may be performed by the neural network model and training component of FIGS. 8 and 9, in accordance with some embodiments.

In the example of FIG. 10, the non-linear analytical model can be the neural network model 900 of FIG. 9. The neural network model 900 operates (block 1012) the input nodes of the input layer to each receive a different one of the content items of a received API transaction request and to output a value. The neural network model 100 operates (block 1014) the weight nodes of a first one of the sequence of neural network layers using weight values to mathematically combine values that are output by a plurality of the input nodes to generate combined values. Each of the weight nodes of the first layer may, for example, sum the values that are output by defined ones of or all of the input nodes, and multiply the summed result by a weight value that can be separately defined for each of the weight nodes (and may thereby be different between the weight nodes on a same layer) to generate one of the combined values.

The neural network model 102 operates (block 1016) the weight nodes of the last one of the sequence of neural network layers using weight values to mathematically combine the combined values from a plurality of weight nodes of a previous one of the sequence of neural network layers to generate combined values. Each of the weight nodes of the last layer may, for example, sum the combined values from a plurality of weight nodes of a previous one of the sequence of neural network layers, and multiply the summed result by a weight value that can be separately defined for each of the weight nodes (and may thereby be different between the weight nodes on a same layer) to generate one of the combined values.

The neural network model 102 operates (block 1018) the output node "O" of the output layer to combine the combined values from the weight nodes of the last one of the sequence of neural network layers to generate the risk assessment score.

The training circuitry 806 can adapt (block 1002), by defining and/or adjusting, the weight values of the weight nodes of at least one of the neural network layers based on content of the earlier API transaction requests in the cluster. Thus, in the context of FIG. 8, the training circuitry 806 can perform the adaptation (block 1002) based on the output of the comparison engine 804 performing comparisons (e.g., pattern recognition) among information in the repository 802 and/or based on feedback received from the destination nodes 110, such as described above for FIG. 8.

Although various embodiments have been disclosed herein for training the neural network model 900 or, more generally, the non-linear analytical model 808 while it is processing one or more received API transaction requests from source nodes 100 which are operationally waiting for corresponding API responses from the destination node(s) 110, in some other embodiments the training is performed offline. For example, the training may be performed during production of the non-linear analytical model before its incorporation into an operational PDP 124 and/or the training may be performed while a PDP 124 is not actively processing API transaction requests from source nodes 100 awaiting API responses, such as while maintenance or other offline processes are performed on the PDP 124 and/or the PEP(s) 122.

Figure 11:
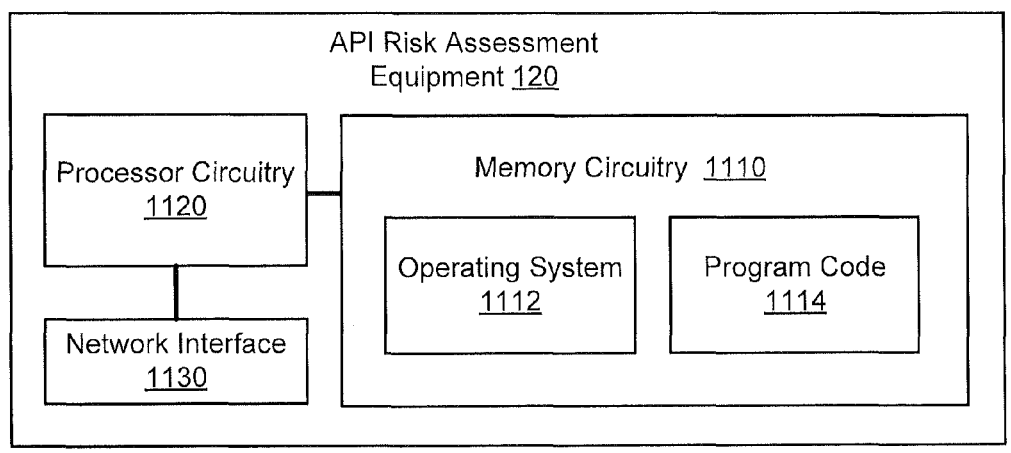
FIG. 11 is a block diagram of an risk assessment equipment that may be used as one or more components of the API risk assessment equipment of FIGS. 1-3, in accordance with some embodiments.

FIG. 11 is a block diagram of API risk assessment equipment 600, such as a computer system, that may be used as the one or more components of the API risk assessment equipment 120 of FIGS. 1 and 2, in accordance with some embodiments. Referring to FIG. 11, the API risk assessment equipment 600 can include a network interface 1130 which communicates via the one or more networks 108$a/b$ other components of the equipment 120 (e.g., PEP 122, PDP 124, etc.), source nodes 100, destination nodes 110, etc. The API risk assessment equipment 600 further includes processor circuitry 1120 (processor) and memory circuitry 1110 (memory) that contains computer program instructions, such as an operating system 1112 and application program code 1114 which performs various operations disclosed herein when executed by the processor 1120. The processor 1120 may include one or more data processing circuits, such as a general purpose and/or special purpose processor (e.g., microprocessor and/or digital signal processor), which may be collocated or distributed across one or more data networks (e.g., networks 108$a$-$b$). The processor 1120 is configured to execute computer program instructions among the program code 1114 in the memory 1110, described below as a computer readable medium, to perform some or all of the operations and methods for one or more of the embodiments disclosed herein for API risk assessment equipment and/or other components.

Further Definitions and Embodiments:

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also, be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of operating application programming interface (API) risk assessment equipment comprising:
    receiving an API transaction request from an application processed by a source node;
    generating a risk assessment score indicating trustworthiness of the API transaction request based on comparison of content of the API transaction request to content of earlier API transaction requests, by identifying a cluster of the earlier API transaction requests having content that satisfies a rule for similarity to content of the API transaction request, and determining whether more than one instance of the application is being concurrently processed by the source node based on comparison of content of the API transaction request to content of the earlier API transaction requests in the cluster; and
    controlling deliverability of the API transaction request based on the risk assessment score to a destination node for processing.

2. The method of claim 1, wherein identifying a cluster of the earlier API transaction requests, comprises:
 identifying earlier API transaction requests that were received from the source node and/or identifying earlier API transaction requests that were received from applications processed by other source nodes having a defined application characteristic that is common to the application processed by the source node.

3. The method of claim 1, wherein generating a risk assessment score, comprises:
 training a non-linear analytical model based on content of the earlier API transaction requests in the cluster; and
 processing content of the API transaction request through the non-linear analytical model to generate the risk assessment score.

4. The method of claim 3,
 wherein the non-linear analytical model comprises a neural network model with an input layer comprising input nodes, a sequence of neural network layers each comprising a plurality of weight nodes, and an output layer comprising an output node; and
 wherein generating a risk assessment score:
  operating the input nodes of the input layer to each receive a different one of items of the content of the API transaction request and to output a value;
  operating the weight nodes of a first one of the sequence of neural network layers using weight values to mathematically combine values that are output by a plurality of the input nodes to generate combined values;
  operating the weight nodes of a last one of the sequence of neural network layers using weight values to mathematically combine the combined values from a plurality of weight nodes of a previous one of the sequence of neural network layers to generate combined values;
  operating the output node of the output layer to combine the combined values from a plurality of the weight nodes of the last one of the sequence of neural network layers to generate the risk assessment score.

5. The method of claim 4, further comprising
 adapting the weight values of the weight nodes of at least one of the neural network layers based on content of the earlier API transaction requests in the cluster.

6. The method of claim 1, wherein generating a risk assessment score, comprises:
 generating the risk assessment score based on how many different source nodes are indicated by content of the earlier API transaction requests in the cluster to be generating the earlier API transaction requests in the cluster.

7. The method of claim 1, wherein generating a risk assessment score, comprises:
 generating the risk assessment score based on comparison of a network address indicated by content of the API transaction request to network addresses indicated by content of the earlier API transaction requests in the cluster.

8. The method of claim 1, wherein generating a risk assessment score, comprises:
 generating the risk assessment score based on comparison of a device identifier of the source node indicated by content of the API transaction request to device identifiers indicated by content of the earlier API transaction requests in the cluster.

9. The method of claim 1, wherein generating a risk assessment score, comprises:
 generating the risk assessment score based on comparison of a geographic location indicated by content of the API transaction request to geographic locations indicated by content of the earlier API transaction requests in the cluster.

10. The method of claim 1, wherein generating a risk assessment score, comprises:
 generating the risk assessment score to indicate untrustworthiness of the API transaction request when a rate at which API transaction requests were received from the source node does not satisfy a threshold rate defined based on another rate at which at least some of the earlier API transaction requests in the cluster were received from a plurality of other source nodes.

11. The method of claim 1, wherein generating a risk assessment score, comprises:
 generating the risk assessment score based on whether the source node has a network address that is within a list of defined network addresses of source nodes that are sources of untrustworthy API transaction requests and/or based on whether the source node has a network address that is within a list of defined network addresses of source nodes that are sources of trustworthy API transaction requests.

12. The method of claim 1, wherein generating a risk assessment score, comprises:
 determining from content of the API transaction request a routing address pathway through a data network from the source node to the API transaction decision equipment; and
 generating the risk assessment score based on whether the routing address pathway includes a network address that is within a list of defined network addresses of anonymizing servers.

13. The method of claim 1, wherein controlling deliverability of the API transaction request based on the risk assessment score to a destination node for processing, comprises:
 forwarding the API transaction request to the destination node based on the risk assessment score satisfying a threshold value; and
 discarding the API transaction request to prevent its processing by an application of the destination node based on the risk assessment score not satisfying the threshold value.

14. The method of claim 1, wherein controlling deliverability of the API transaction request based on the risk assessment score to a destination node for processing, comprises:
 forwarding the API transaction request to the destination node based on the risk assessment score satisfying a threshold value; and
 modifying content of the API transaction request to generate a modified API transaction request and forwarding the modified API transaction request to the destination node based on the risk assessment score not satisfying the threshold value, the modified content constraining what type of information will be accessed by the modified API transaction request when processed by an application on the destination node.

15. The method of claim 1, wherein controlling deliverability of the API transaction request based on the risk assessment score to a destination node for processing, comprises:
 communicating an authentication challenge message to the source node based on the risk assessment score not satisfying a threshold value;
 receiving an authentication response message from the source node; and
 controlling deliverability of the API transaction request to the destination node based on content of the authentication response message.

16. A method of operating application programming interface (API) risk assessment equipment comprising:
- receiving an API transaction request from an application processed by a source node;
- generating a risk assessment score indicating trustworthiness of the API transaction request based on comparison of content of the API transaction request to content of earlier API transaction requests from a plurality of other source nodes; and
- controlling deliverability of the API transaction request based on the risk assessment score to a destination node for processing,
- wherein generating the risk assessment score based on comparison of content of the API transaction request to content of the earlier API transaction requests from a plurality of other source nodes, comprises:
- identifying one of a plurality of defined API transaction protocols that is being used by the API transaction request; and
- generating the risk assessment score based on comparison of the identified one of the plurality of defined API transaction protocols to API transaction protocols used by the earlier API transaction requests from the plurality of other source nodes.

17. The method of claim 16, wherein generating the risk assessment score based on comparison of content of the API transaction request to content of the earlier API transaction requests from a plurality of other source nodes, comprises:
- determining a first information characteristic that will be accessed by the API transaction request when processed by the destination node;
- determining a second information characteristic that has been accessed by the API transaction requests from the plurality of other source nodes when processed; and
- generating the risk assessment score based on comparison of the first and second information characteristics.

* * * * *